(12) United States Patent
Lee

(10) Patent No.: US 11,082,549 B2
(45) Date of Patent: Aug. 3, 2021

(54) METHOD FOR PROCESSING EVENT NOTIFICATION AND ELECTRONIC DEVICE FOR SUPPORTING THE SAME

(71) Applicant: Samsung Electronics Co., Ltd., Gyeonggi-do (KR)

(72) Inventor: Hwa Jun Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 203 days.

(21) Appl. No.: 15/490,432

(22) Filed: Apr. 18, 2017

(65) Prior Publication Data

US 2017/0300194 A1 Oct. 19, 2017

(30) Foreign Application Priority Data

Apr. 18, 2016 (KR) .................. 10-2016-0047158

(51) Int. Cl.
| | |
|---|---|
| *G06F 3/0482* | (2013.01) |
| *H04M 1/72403* | (2021.01) |
| *G06F 3/0481* | (2013.01) |
| *H04M 1/72469* | (2021.01) |

(52) U.S. Cl.
CPC ...... *H04M 1/72403* (2021.01); *G06F 3/0482* (2013.01); *G06F 3/04817* (2013.01); *H04M 1/72469* (2021.01); *H04M 2215/81* (2013.01); *H04M 2215/8129* (2013.01)

(58) Field of Classification Search
CPC ......... G06F 3/0482; G06F 2203/04803; G06F 3/04842; H04M 19/04; H04M 2215/815; H04M 15/85; H04M 2215/8129; H04M 2215/81; H04N 21/47214; H04N 21/472; H04L 51/24; H04W 68/00
See application file for complete search history.

(56) References Cited

U.S. PATENT DOCUMENTS

| | | | |
|---|---|---|---|
| 8,723,823 B2 | 5/2014 | Shia et al. | |
| 9,154,606 B2 | 10/2015 | Tseng et al. | |
| 9,191,486 B2 | 11/2015 | Tseng et al. | |
| 9,270,628 B2 | 2/2016 | Shia et al. | |
| 9,276,890 B2 | 3/2016 | Shia et al. | |
| 9,471,141 B1 * | 10/2016 | Noble | G06F 3/013 |

(Continued)

FOREIGN PATENT DOCUMENTS

| | | |
|---|---|---|
| CN | 104461243 | 3/2015 |
| JP | 2005228091 | 8/2005 |

(Continued)

OTHER PUBLICATIONS

International Search Report dated Jul. 28, 2017 issued in counterpart application No. PCT/KR2017/004113, 11 pages.

(Continued)

*Primary Examiner* — Shen Shiau

(74) *Attorney, Agent, or Firm* — The Farrell Law Firm, P.C.

(57) ABSTRACT

A method for processing an event notification and an electronic device for supporting the same are provided. The method includes obtaining event information; and displaying a notification display item indicating that the event information is obtained, the notification display item being displayed on a screen location that is different from a location where a display item corresponding to the notification display item is displayed.

14 Claims, 11 Drawing Sheets

(56) References Cited

U.S. PATENT DOCUMENTS

| | | | |
|---|---|---|---|
| 9,680,987 B2* | 6/2017 | Lee | H04M 1/72583 |
| 9,747,072 B2* | 8/2017 | Noble | G06F 3/013 |
| 10,318,034 B1* | 6/2019 | Hauenstein | G06F 3/0486 |
| 10,637,982 B2* | 4/2020 | Choi | H04M 1/72427 |
| 2009/0249247 A1 | 10/2009 | Tseng et al. | |
| 2010/0058231 A1* | 3/2010 | Duarte | G06F 3/0481 715/800 |
| 2012/0117507 A1 | 5/2012 | Tseng et al. | |
| 2012/0204191 A1* | 8/2012 | Shia | G06Q 10/10 719/318 |
| 2012/0317498 A1* | 12/2012 | Logan | G06F 3/04817 715/752 |
| 2013/0290986 A1* | 10/2013 | Kobayashi | G06F 3/01 719/318 |
| 2014/0189597 A1* | 7/2014 | Kang | G06F 3/04817 715/835 |
| 2014/0191986 A1* | 7/2014 | Kim | G06F 3/0488 345/173 |
| 2014/0208336 A1 | 7/2014 | Shia et al. | |
| 2014/0237385 A1 | 8/2014 | Shia et al. | |
| 2014/0256295 A1 | 9/2014 | Peng et al. | |
| 2014/0351744 A1 | 11/2014 | Jeon et al. | |
| 2015/0077258 A1 | 3/2015 | Nelson et al. | |
| 2015/0177970 A1 | 6/2015 | Choi | |
| 2015/0339055 A1 | 11/2015 | Cho | |
| 2015/0350414 A1* | 12/2015 | Park | G06F 3/0486 715/808 |
| 2016/0080551 A1 | 3/2016 | Tseng et al. | |
| 2016/0259413 A1* | 9/2016 | Anzures | G06F 3/0481 |
| 2016/0259497 A1* | 9/2016 | Foss | G06F 3/0488 |
| 2016/0259498 A1* | 9/2016 | Foss | H04L 67/32 |
| 2016/0259499 A1* | 9/2016 | Kocienda | G06T 13/80 |
| 2016/0259518 A1* | 9/2016 | King | G06F 3/016 |
| 2016/0259519 A1* | 9/2016 | Foss | H04L 67/32 |
| 2016/0259527 A1* | 9/2016 | Kocienda | G06F 3/04817 |
| 2016/0259528 A1* | 9/2016 | Foss | G06F 3/0488 |
| 2017/0046024 A1* | 2/2017 | Dascola | G06F 3/0485 |
| 2017/0102916 A1* | 4/2017 | Noble | G06F 3/013 |
| 2017/0177200 A1* | 6/2017 | Jeong | G06F 3/04842 |
| 2017/0201850 A1* | 7/2017 | Raleigh | G06F 3/0482 |
| 2017/0272564 A1 | 9/2017 | Duarte et al. | |
| 2017/0300194 A1* | 10/2017 | Lee | H04M 1/72522 |
| 2018/0046434 A1* | 2/2018 | Noble | G06F 3/013 |
| 2018/0359350 A1* | 12/2018 | Kim | H04M 1/0214 |
| 2019/0273816 A1* | 9/2019 | Choi | H04M 1/72472 |

FOREIGN PATENT DOCUMENTS

| | | |
|---|---|---|
| JP | 2015026318 | 2/2015 |
| KR | 1020150084579 | 7/2015 |

OTHER PUBLICATIONS

European Search Report dated Feb. 19, 2019 issued in counterpart application No. 17786141.6-1219, 7 pages.

* cited by examiner

METHOD FOR PROCESSING EVENT NOTIFICATION AND ELECTRONIC DEVICE FOR SUPPORTING THE SAME

PRIORITY

This application claims priority under 35 U.S.C. § 119(a) to Korean Patent Application Serial No. 10-2016-0047158, which was filed in the Korean Intellectual Property Office on Apr. 18, 2016, the entire disclosure of which is incorporated herein by reference.

BACKGROUND

1. Field of the Disclosure

The present disclosure relates generally to processing event notifications, and more particularly, to an apparatus and method for displaying an event notification for convenient processing of the event by a user.

2. Description of the Related Art

A portable electronic device may output a variety of screens, such as a home screen, an application collection screen, etc. An application display item (e.g., an icon) may be located on each of the various screens. Conventionally, if an event associated with a specific application is generated, e.g., a received message, an electronic device may display an event indicator (e.g., a badge) in a status bar, which is commonly located on the top of the display with a clock.

However, even after seeing the event indicator, the user should find a corresponding application display item, one by one, often while performing a screen search, in order to execute the application and process the notification, e.g., read the received message.

Also, while an event indicator may be displayed on a corresponding application display item, if the application display item is not a screen viewed by the user, it may not be seen or still may be difficult for the user to find.

SUMMARY

The present disclosure is made to address at least the above-mentioned problems and/or disadvantages and to provide at least the advantages described below.

Accordingly, an aspect of the present disclosure is to provide a method for quickly processing an event notification and easily accessing, verifying, and processing an event indicator by displaying an application display item (e.g., icon) including the event indicator on a specified location and an electronic device for supporting the same.

In accordance with an aspect of the present disclosure, an electronic device is provided, which includes a memory configured to store event information based on an occurrence of an event and a notification display item to be output based on the occurrence of the event; a display configured to display the notification display item; and a processor configured to identify that the event information is obtained, and control the display to display the notification display item indicating that the event information is obtained, in response to the event information being obtained. The notification display item is output on a screen location different from a location where a display item corresponding to the notification display item is displayed.

In accordance with another aspect of the present disclosure, a method for processing an event notification is provided. The method includes obtaining event information; and displaying a notification display item indicating that the event information is obtained, the notification display item being displayed on a screen location that is different from a location where a display item corresponding to the notification display item is displayed.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
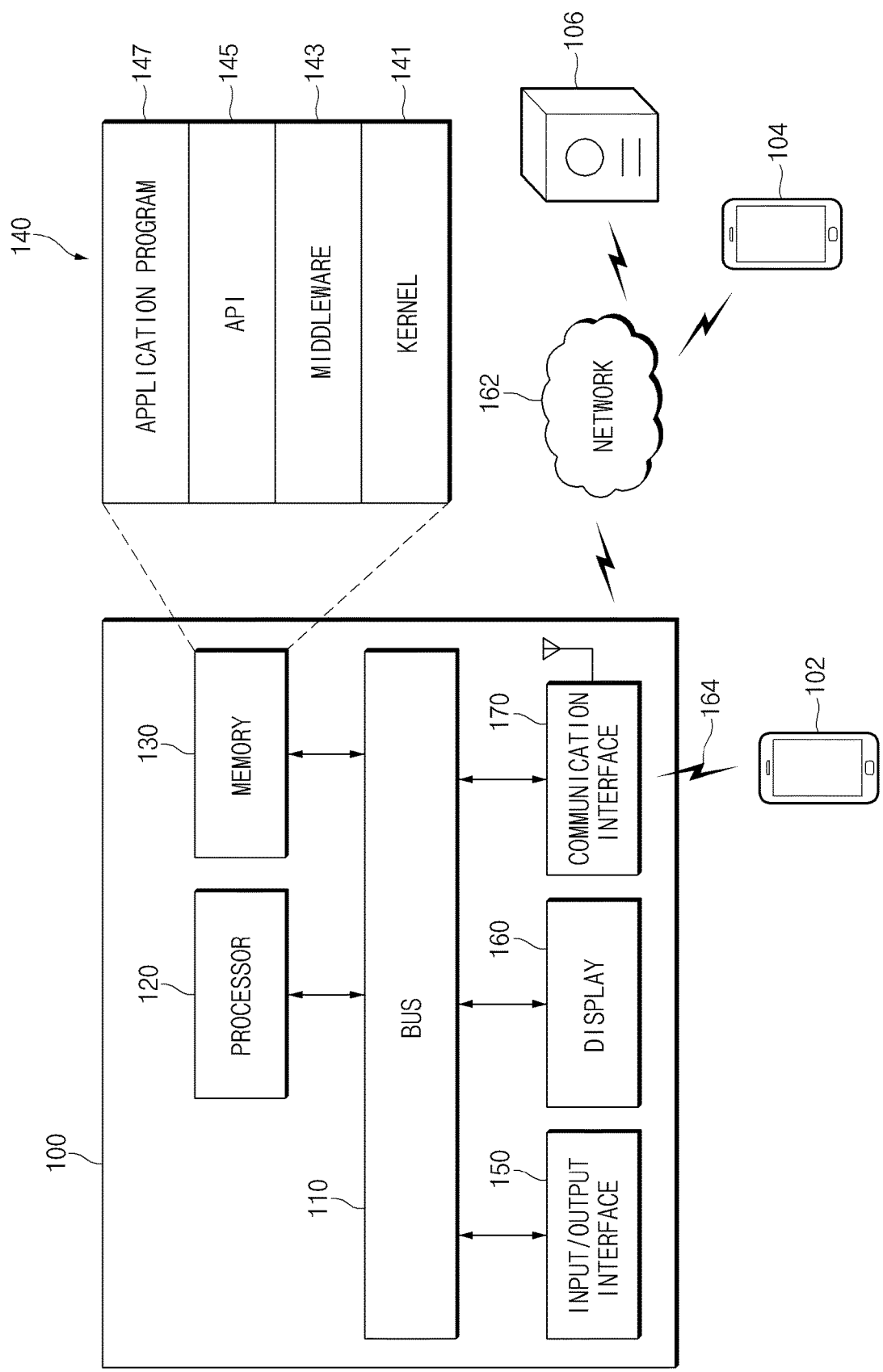
FIG. 1 illustrates an environment in which an electronic device is operated, according to an embodiment of the present disclosure.

Hereinafter, various embodiments of the present disclosure are described with reference to accompanying drawings. Accordingly, those of ordinary skill in the art will recognize that modifications, equivalents, and/or alternatives of the embodiments described herein can be variously made without departing from the scope and spirit of the present disclosure.

With regard to description of drawings, similar elements may be marked by similar reference numerals.

Terms and expressions in this disclosure are used to describe certain embodiments and are not intended to limit the scope of the present disclosure. Terms of a singular form may include plural forms unless otherwise specified. All the terms used herein, which include technical or scientific terms, may have the same meanings that are generally understood by a person skilled in the art. Terms that are defined in a dictionary and commonly used should also be interpreted as is customary in the relevant related art and not in an idealized or overly formal manner unless expressly defined as such herein. Even if terms are defined in this disclosure, they may not be interpreted to exclude embodiments of this disclosure.

Herein, the expressions "have", "may have", "include", "comprise", "may include", and "may comprise" indicate the existence of corresponding features (e.g., elements such as numeric values, functions, operations, and/or components) but do not exclude the presence of additional features.

The expressions "A or B", "at least one of A or/and B", or "one or more of A or/and B" may include any and all combinations of one or more of the associated listed items. For example, the expression "A or B", "at least one of A and B", or "at least one of A or B" may refer to (1) where at least one A is included, (2) where at least one B is included, or (3) where both of at least one A and at least one B are included.

Numerical terms, such as "first", "second", etc., used herein, may refer to various elements regardless of the order and/or the priority and distinguish the relevant elements from other elements, but do not limit the elements. For example, "a first user device" and "a second user device" indicate different user devices, regardless of order or priority. Accordingly, a first element may be referred to as a second element, and similarly, a second element may be referred to as a first element.

When an element (e.g., a first element) is referred to as being "(operatively or communicatively) coupled with/to" or "connected to" another element (e.g., a second element), the first element may be directly coupled with/to or connected to the second element or an intervening element (e.g., a third element) may be present therebetween. However, when the first element is referred to as being "directly coupled with/to" or "directly connected to" the second element, no intervening element may be present therebetween.

According to context, the expression "configured to" may be used interchangeably with the expressions "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)), which performs corresponding operations by executing one or more software programs that are stored in a memory device.

Electronic devices according to an embodiment of the disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. For example, a wearable device may include an accessory type device (e.g., a watch, a ring, a bracelet, an anklet, a necklace, glasses, a contact lens, or a head-mounted-device (HMD)), a fabric or garment-integrated type device (e.g., electronic apparel), a body-attached type device (e.g., a skin pad or a tattoo), or a bio-implantable type (e.g., an implantable circuit).

Electronic devices may also be home appliances, such as televisions (TVs), digital versatile disc (DVD) players, audio players, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, electronic picture frames, etc.

Electronic devices may also include various medical devices (e.g., various portable medical measurement devices (e.g., blood glucose monitoring devices, heartbeat measuring devices, blood pressure measuring devices, body temperature measuring devices, etc.), magnetic resonance angiography (MRA) devices, magnetic resonance imaging (MRI) devices, computed tomography (CT) devices, scanners, and ultrasonic devices), navigation devices, Global Navigation Satellite System (GNSS) devices, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), point of sales (POSs) devices of stores, or Internet of things (IoT) devices (e.g., light bulbs, sensors, electric or gas meters, sprinkler devices, fire alarms, thermostats, street lamps, toasters, exercise equipment, hot water tanks, heaters, boilers, etc.).

Electronic devices may also include parts of furniture or buildings/structures, electronic boards, electronic signature receiving devices, projectors, or various measuring instruments (e.g., water meters, electricity meters, gas meters, wave meters, etc.).

An electronic device may also be a flexible electronic device.

An electronic device may be one of the above-described devices or a combination thereof.

Further, an electronic device according to an embodiment of this disclosure is not limited to the above-described electronic devices and may include other electronic devices and new electronic devices according to the development of technologies.

Herein, the term "user" may refer to a person who uses an electronic device or may refer to a device (e.g., an artificial intelligence electronic device) that uses the electronic device.

FIG. 1 illustrates an environment in which an electronic device is operated, according to an embodiment of the present disclosure.

Referring to FIG. 1, the environment includes an electronic device 100, a first external electronic device 102, a second external electronic device 104, a network 162, and a server 106.

The electronic device 100 includes a bus 110, a processor 120, a memory 130, an input/output interface 150, a display 160, and a communication interface 170.

The electronic device 100 may receive a chat message, a call message, a communication connection message, content data, update data, etc., from at least one of the server 106 and the first and second external electronic devices 102 and 104. In response to receiving schedule information or a schedule signal from the server 106, the first external electronic devices 102, the second external electronic device 104, etc., the electronic device 100 may output an event indicator corresponding to an event notification (e.g., an update event notification, a push event notification, etc.). The electronic device 100 may output an event indicator corresponding to an event notification (e.g., a system event notification) to be processed therein, based on operation of a processor 120.

The bus 110 may transmit a signal between the elements (e.g., the processor 120, the memory 130, the input/output interface 150, the display 160, and the communication interface 170). The bus 110 may transmit information received via the communication interface 170 to the processor 120 and may transmit an event indicator to the display 160 in response to control of the processor 120.

The processor 120 may include one or more of a CPU, an AP, or a communication processor (CP). The processor 120 may perform an arithmetic operation or data processing associated with control and/or communication of at least other elements of the electronic device 100. The processor 120 may display a notification display item including an event indicator on a specified location, which is different from a location of a display item (e.g., an application icon). Alternatively, the processor 120 may display notification display items respectively including event indicators, such that a displayed location is within a specified distance or such that the notification display items are adjacent to each other. Alternatively, the processor 120 may display notification display items respectively including event indicators on the uppermost screen of the display 160 or a screen displayed when a lock screen is unlocked. Alternatively, if a plurality of events associated with different types of applications are generated and if event information about the events is collected (or obtained), the processor 120 may display indication items respectively including event indicators to be displayed, on a specified grouping box (or a specified grouping region) in response to the generation of the events (or the collected event information). Alternatively, the processor 120 may be configured to output a "remove all" object configured to remove a plurality of event indicators or to output a list view virtual object configured to display a list of detailed description information of the plurality of event indicators.

The memory 130 may include a volatile memory and/or nonvolatile memory. For example, the memory 130 may store instructions or data associated with at least one other element(s) of the electronic device 100. The memory 130 may store software and/or a program 140. The program 140 includes a kernel 141, a middleware 143, an application programming interface (API) 145, and an application program (or "an application") 147. At least a part of the kernel 141, the middleware 143, or the API 145 may be referred to as an "operating system (OS)".

The kernel 141 may control or manage system resources (e.g., the bus 110, the processor 120, the memory 130, etc.) that are used to execute operations or functions of other programs (e.g., the middleware 143, the API 145, and the application 147). Further, the kernel 141 may provide an interface that allows the middleware 143, the API 145, or the application 147 to access discrete elements of the electronic device 100 in order to control or manage system resources.

The middleware 143 may act as intermediary for the API 145 or the application 147 to communicate with the kernel 141 and exchange data.

Further, the middleware 143 may process task requests received from the application 147 according to a priority. The middleware 143 may assign a priority, which makes it possible to use a system resource (e.g., the bus 110, the processor 120, the memory 130, etc.) of the electronic device 100, to at least one of the application 147. For example, the middleware 143 may process the one or more task requests according to the assigned priority, which makes it possible to perform scheduling or load balancing on the one or more task requests.

The API 145 may be an interface through which the application 147 controls a function provided by the kernel 141 or the middleware 143, and may include at least one interface or function (e.g., an instruction) for a file control, a window control, image processing, a character control, etc.

The application 147 may support a function operated in the electronic device 100. At least one specified icon or display item may be output on a screen of the display 160 in response to the application 147. For example, a home screen, an application collection screen, a widget collection screen, a user application collection screen, etc., may be output on the display 160. A display item may be output on a screen displayed on the display 160. An event indicator may be located on the display item based on generation of an event or based on event information collected in response to a generated event.

Alternatively, a separate notification display item including the event indicator may be provided. The display 160 may a notification display item corresponding to generation of an event or collection of event information. An event indicator may be omitted from a notification display item displayed on a specified location of the display 160 (e.g., a specified location of a home screen, a new home screen associated with a notification display time, etc.) or a specified region (e.g., a grouping box).

The display 160 may include an icon associated with executing an application. If a specified event associated with the application is generated, the display 160 may output a notification display icon, which is substantially the same as the application icon but is located on a specified screen region, which is different than the location of the icon. The display 160 may locate notification display icons to be adjacent on a specified screen region, in response to a plurality of unidentified (or unverified) event information associated with different types of applications. The event indicator may have a variety of characters, numerals, colors, etc., in connection with the number of times an event is generated or an emergency level.

If a notification display item is output, the event indicator may be omitted.

In operating the application 147, the memory 130 may store at least one screen information, display item information displayed on a screen, event indicator information, detailed event contents information corresponding to an event indicator, etc. Further, the memory 130 may store grouping box information. The grouping box information may include information such as the number of notification display items respectively including event indicators and a type of a notification display item. Alternatively, the memory 130 may include specified location information on which a notification display item on which the event indicator is located will be displayed and on which the grouping box information will be displayed.

The input/output interface 150 may act as an interface for transmitting an instruction or data input from a user or another external device, to other element(s) of the electronic device 100. The input/output interface 150 may output an instruction or data, received from other element(s) of the electronic device 100, to a user or another external device. The input/output interface 150 may include an audio device, which outputs audio information for guiding generation of an event or collection of event information. For example, the audio device may output audio information corresponding to that a grouping box is generated in response to generation of a plurality of events, audio information corresponding to that event indicators are removed based on verification of a grouping box, audio information corresponding to removal of a grouping box, etc. The above-mentioned audio information may be stored in the memory 130 and output in response to control of the processor 120.

The display 160 may include a liquid crystal display (LCD), a light-emitting diode (LED) display, an organic LED (OLED) display, a microelectromechanical systems (MEMS) display, and/or an electronic paper display. The display 160 may display various content (e.g., a text, an image, a video, an icon, a symbol, etc.) to a user. The display 160 may include a touch screen and may receive a touch input, a gesture input, a proximity input, and/or a hovering input using an electronic pen or a part of a user's body.

The display 160 may output a home screen, an application collection screen, a lock screen, etc. The display 160 may output a notification display item including an event indicator on a specified location of at least one of the above-mentioned screens based on settings. Alternatively, the display 160 may output a grouping box on at least one of the screens and may display a plurality of notification display items (e.g., items respectively including event indicators), included in the grouping box, based on settings. If the grouping box is selected, the display 160 may output the plurality of notification display items on a screen associated with the grouping box (e.g., output the notification display items as a multi-thumbnail structure, a list structure, etc.).

The display 160 may display a "remove all" object associated with at least one notification display item including an event indicator or display a list view virtual object associated with viewing a list of event indication contents of a notification display item.

The communication interface 170 may establish communication between the electronic device 100 and the first external electronic device 102, the second external electronic device 104, or the server 106. For example, the communication interface 170 may be connected to the network 162 over wireless communication or wired communication to communicate with the second external electronic device 104 or the server 106.

The wireless communication may include long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), etc., as cellular communication protocol. Further, the wireless communication may include a short range communication 164, such as Wi-Fi, Bluetooth, near field communication (NFC), magnetic stripe transmission (MST), etc.

The MST may generate a pulse in response to transmission data using an electromagnetic signal, and the pulse may generate a magnetic field signal. The electronic device 100 may transfer the magnetic field signal to a POS device, which may detect the magnetic field signal using an MST reader. The POS device may recover the data by converting the detected magnetic field signal to an electrical signal. The electronic device 100 may process generation of an event associated with driving the MST. For example, the electronic device 100 may process information about an MST-based signal transmission completion event, information about an MST-based payment completion event, etc. In this operation, the electronic device 100 may display an event indicator according to collection of event information on a display item (or an icon) associated with an MST function or may display a notification display item including an event indicator on a specified location of the display 160.

The GNSS may include at least one of a global positioning system (GPS), a global navigation satellite system (Glonass), a Beidou navigation satellite system (Beidou), or a European global satellite-based navigation system (Galileo) based on an available region, a bandwidth, etc. Herein, "GPS" and "GNSS" may be used interchangeably.

The wired communication may include at least one of a universal serial bus (USB), a high definition multimedia interface (HDMI), a recommended standard-232 (RS-232), a plain old telephone service (POTS), etc.

The network 162 may include at least one of telecommunications networks, such as a computer network (e.g., a local area network (LAN) or a wide area network (WAN)), the Internet, or a telephone network.

If location information is collected in connection with a GNSS function, the electronic device 100 may process an event associated with the collected location information. For example, if an event to be output is generated as the electronic device 100 arrives at a specified location, the electronic device 100 may display an event indicator on a location adjacent to a related notification display item. Alternatively, the electronic device 100 may output a notification display item including a location related event indicator on a specified location of a specified screen of the display 160.

Each of the first and second external electronic devices 102 and 104 may be the same or different type of device as the electronic device 100.

The server 106 may include a group of one or more servers.

All or a portion of operations that the electronic device 100 will perform may be executed by the first external electronic device 102, the second external electronic device 104 and/or the server 106. For example, when the electronic device 100 executes a function or service, the electronic device 100 may request at least a portion of a function associated with the electronic device 100 to be performed by the electronic device 102 or 104 and/or the server 106. The other electronic device may execute the requested function or additional function and may transmit the execution result to the electronic device 100. The electronic device 100 may provide the requested function or service using the received result or may additionally process the received result to provide the requested function or service. To this end, cloud computing, distributed computing, or client-server computing may be used.

The electronic device 100 may process various events associated with a transmission start of a specified content, during transmission of the specified content, and transmission completion of the specified content among a connection with the first or second external electronic device 102 or 104, a disconnection from the first or second external electronic device 102 or 104, and connecting with the first or second external electronic device 102 or 104. While processing operation, the electronic device 100 may output an event indicator corresponding to a generated event together with a notification display item. Alternatively, the electronic device 100 may output a notification display item including the event indicator on a specified location (or a grouping box) of the display 160, different from a location where a display item is currently displayed.

Figure 2:
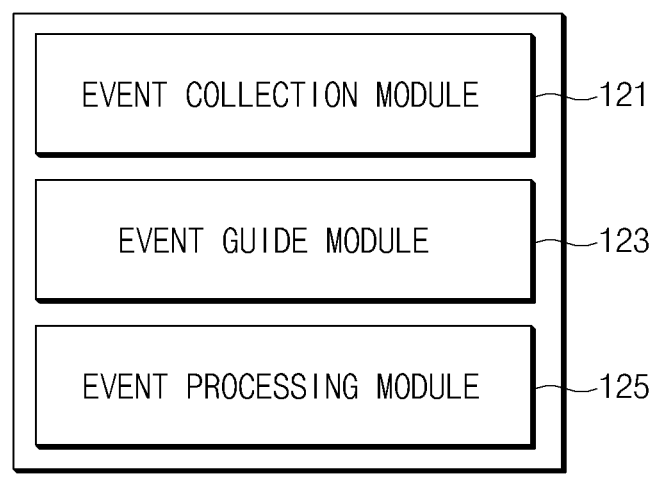
FIG. 2 illustrates a processor of an electronic device according to an embodiment of the present disclosure.

FIG. 2 illustrates a processor of an electronic device according to an embodiment of the present disclosure. For example, the processor 120 may be constructed as illustrated in FIG. 2. Referring to FIG. 2, the processor includes an event collection module 121, an event guide module 123, and an event processing module 125. At least some of the components of the processor 120 may be implemented as at least one hardware processor or a software module. If the event collection module 121, the event guide module 123, and the event processing module 125 are implemented as software modules, the electronic device may include at least one instruction set which is stored in a memory and is executed by the processor.

The event collection module 121 may verify generation of various events associated with the electronic device and may collect event information corresponding to the generated event (e.g., at least one of details of the event, the number of times the event is generated, a time when the event is generated, and visual information or audio information to be output in connection with the event). The event collection module 121 may collect information about various events associated with executing or updating an application installed in the electronic device.

The event collection module 121 may collect information about an event associated with communication with an external device, e.g., the server 106 or the first and second external electronic devices 102 and 104 of FIG. 1, information about an event associated with communication with specified access points, via a communication interface. For example, the event collection module 121 may collect event information indicating a non-connected call (e.g., a missed call) associated with a telephony function, event information indicating reception of a message (e.g., a new message), event information indicating reception of an e-mail, event information indicating access to a specified social networking service (SNS), or a change of content of the specified SNS (e.g., register a new post, register a comment, etc.), event information associated with an address book, event information associated with a schedule function (e.g., arrival of a schedule, etc.), event information associated with a my-story application, etc.

Alternatively, the event collection module 121 may collect information about an event generated based on a communication connection, while the electronic device operates as a hotspot (e.g., information about an event which guides access of another electronic device, information about a data transmission and reception event with another electronic device, and the like), and information about an event associated with a Wi-Fi-based communication connection, a Wi-Fi-based communication connection failure, a Wi-Fi-based communication disconnection, etc.

Alternatively, the event collection module 121 may collect event information according to data usage in a process of communicating with a server, based on a network.

If event information is collected, the event collection module 121 may transmit event related information (e.g., application information associated with the event information, display item information associated with the event information, etc.) to the event guide module 123.

Upon receiving the event related information from the event collection module 121, the event guide module 123 may output a notification display item including an event indicator on a display. In this operation, the event guide module 123 may output the notification display item including the event indicator in various forms based on settings. For example, the event guide module 123 may display the notification display item including the event indicator on a specified screen and may additionally display the event indicator on a previously displayed display item. Alternatively, the event guide module 123 may display the notification display item including the event indicator on the specified screen without displaying a separate event indicator on a previously displayed display item.

The event guide module 123 may output the notification display item including the event indicator on a specified region of a screen initially displayed while the display 160 is changed from a turn-on state to a turn-off state. Alternatively, the event guide module 123 may display the notification display item including the event indicator on a specified location of a screen initially displayed when a lock screen is unlocked. Alternatively, the event guide module 123 may generate a new screen (e.g., a new home screen or a new homepage) and may output the notification display item including the event indicator on the new screen.

The event guide module 123 may output a plurality of notification display items respectively including event indicators, included in a grouping box, on a specified screen. If an event (e.g., a user input) for selecting the grouping box is generated, the event guide module 123 may display the notification display items respectively including the event indicator, included in the grouping box, in an arrangement (e.g., an in-line arrangement, a list arrangement, etc.). If a first specified user input (e.g., a list view function) is selected, the event guide module 123 may display details associated with the event indicator of each of the notification display items in the form of a list. If a second specified user input (e.g., the "remove all" function of an event indicator) is selected, the event guide module 123 may delete all of the event indicators located on a notification display item or notification display items. In response to this operation, the event guide module 123 may remove a grouping box from a screen. Alternatively, the event guide module 123 may remove a new homepage generated for outputting a notification display item including an event indicator.

The event processing module 125 may execute a specified application in response to a user input associated with a notification display item including an event indicator and may output a screen where the specified application is executed on the display 160. In this operation, the event processing module 125 may stop outputting the notification display item including the event indicator.

Alternatively, if indication details corresponding to an event indicator are processed, the event processing module 125 may stop outputting the notification display item including the event indicator. Alternatively, the event processing module 125 may output a function execution screen associated with an event indicator in response to a user input. For example, if a user input for selecting the notification display item including the event indicator is generated, the event processing module 125 may output a pop-up window for inquiring whether to establish a communication channel with the specified server 106, or may receive data associated with the event indicator from the specified server 106. During the above-mentioned operation, the event guide module 123 may output a notification display item which is not selected among notification display items respectively including event indicators or a grouping box on a location of a screen.

Figure 3:
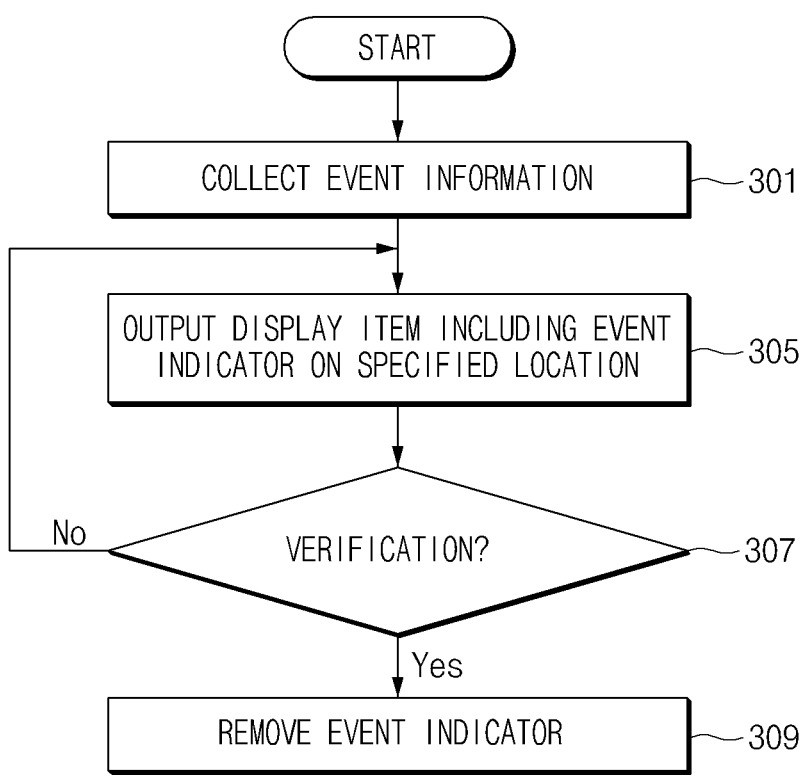
FIG. 3 is a flowchart illustrating a method for processing an event notification in an electronic device according to an embodiment of the present disclosure.

FIG. 3 is a flowchart illustrating a method for processing an event notification in an electronic device according to an embodiment of the present disclosure. For example, the method of FIG. 3 will be described as being performed by the electronic device 100 of FIG. 1 including the processor of FIG. 2.

Referring to FIG. 3, in step 301, the processor 120 (e.g., the event collection module 121) of the electronic device 100 collects event information. As described above, the collection of the event information may include collection of event information associated with a communication channel associated with executing an application function of the electronic device 100, collection of event information associated with data transmission and reception, and/or collection of event information associated with a schedule.

In step 305, the processor 120 (e.g., the event guide module 123) outputs a notification display item including an event indicator on a specified location. For example, the processor 120 may generate a new home screen and may output the notification display item including the event indicator on a specified location of the generated new home screen. A notification display item of a previously displayed location may be maintained in a display state or may be temporarily removed. If the notification display item is temporarily removed and if a function associated with the event indicator of the notification display item is performed, the temporarily removed notification display item may be displayed again on a specified location (e.g., an originally displayed location).

In step 307, the processor 120 (e.g., the event processing module 125) determines whether a verification of the notification display item including the event indicator occurs (e.g., whether a user input for selecting the notification display item is received). If the verification of the notification display item including the event indicator does not occur in step 307, the processor 120 maintains displaying the notification display item including the event indicator in step 305. However, if the verification of the notification display item including the event indicator occurs in step 307, the processor 120 (e.g., the event processing module 125) removes the event indicator in step 309. Alternatively, the processor 120 may stop displaying the notification display item including the event indicator, or output a function execution screen associated with the event indicator on the display 160 based on a verification request while removing the displayed event indicator.

Figure 4:
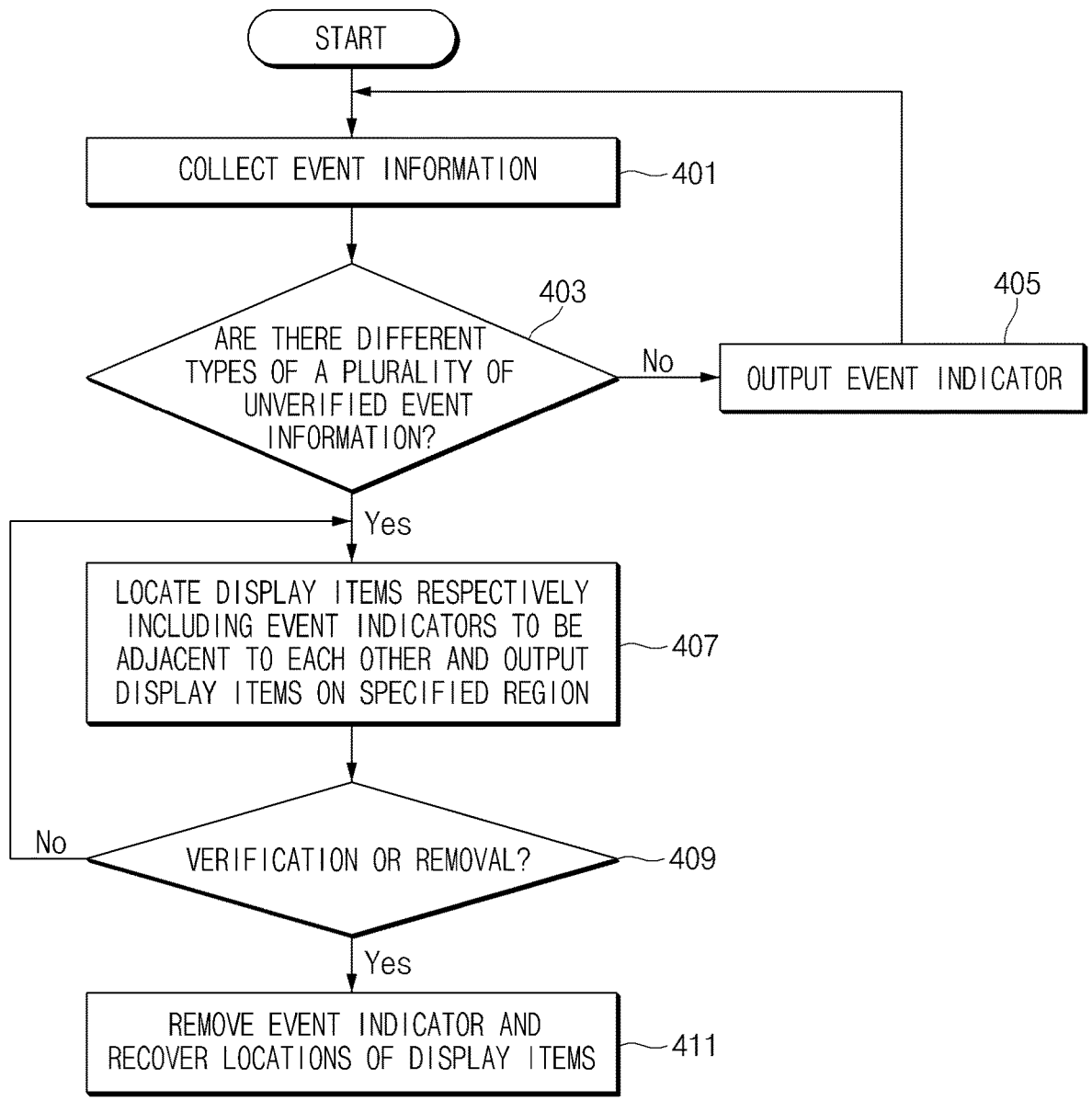
FIG. 4 is a flowchart illustrating a method for processing a plurality of event notifications according to an embodiment of the present disclosure.

FIG. 4 is a flowchart illustrating a method for processing a plurality of event notifications according to an embodiment of the present disclosure. For example, the method of FIG. 4 will be described as being performed by the electronic device 100 of FIG. 1 including the processor of FIG. 2.

Referring to FIG. 4, in step 401, the processor 120 (e.g., the event collection module 121) collects event information according to occurrences of events. As described above, the collected event information may include event information associated with a communication function, system event information according to settings, etc.

In step 403, the processor 120 (e.g., the event collection module 121) determines whether there are different types of collected event information. If there is only one type of collected event information in step 403, the processor 120 (e.g., the event guide module 123) output one event indicator in step 405. For example, the processor 120 may output a notification display item including the event indicator on a specified location, as described in FIG. 3. Alternatively, the processor 120 may output the event indicator on a region adjacent to the notification display item located on the specified location.

If there are different types of collected event information in step 403, the processor 120 (e.g., the event guide module 123) locates respective notification display items corresponding to the different types of collected event information and displays, on a specified region, the located notification display items with event indicators. For example, the processor 120 may display a plurality of notification display items respectively including event indicators on a specific area of a home screen. The processor 120 may newly display a notification display item including an event indicator. In response to this, the processor 120 may output or remove a previously displayed display item, based on settings.

In step 409, the processor 120 (e.g., the event guide module 123 or the event processing module 125) determines whether a user input associated with verifying event information or a user input associated with removing an event indicator is received. If the user input associated with the verification or removal is not received, the processor 120 maintains the displaying in step 407. However, if the user input associated with the verification or removal is received in step 409, the event guide module 123 removes a corresponding event indicator and may recover a display item temporarily removed by a notification display item in step 411.

Alternatively, the processor 120 may remove only notification display items respectively including newly displayed event indicators from a screen. When outputting a notification display item including an event indicator, if a previously displayed display item is maintained, the processor 120 may remove only a newly displayed notification display item from a screen, rather than recovering a location of each of the display items in step 411.

Figure 5:
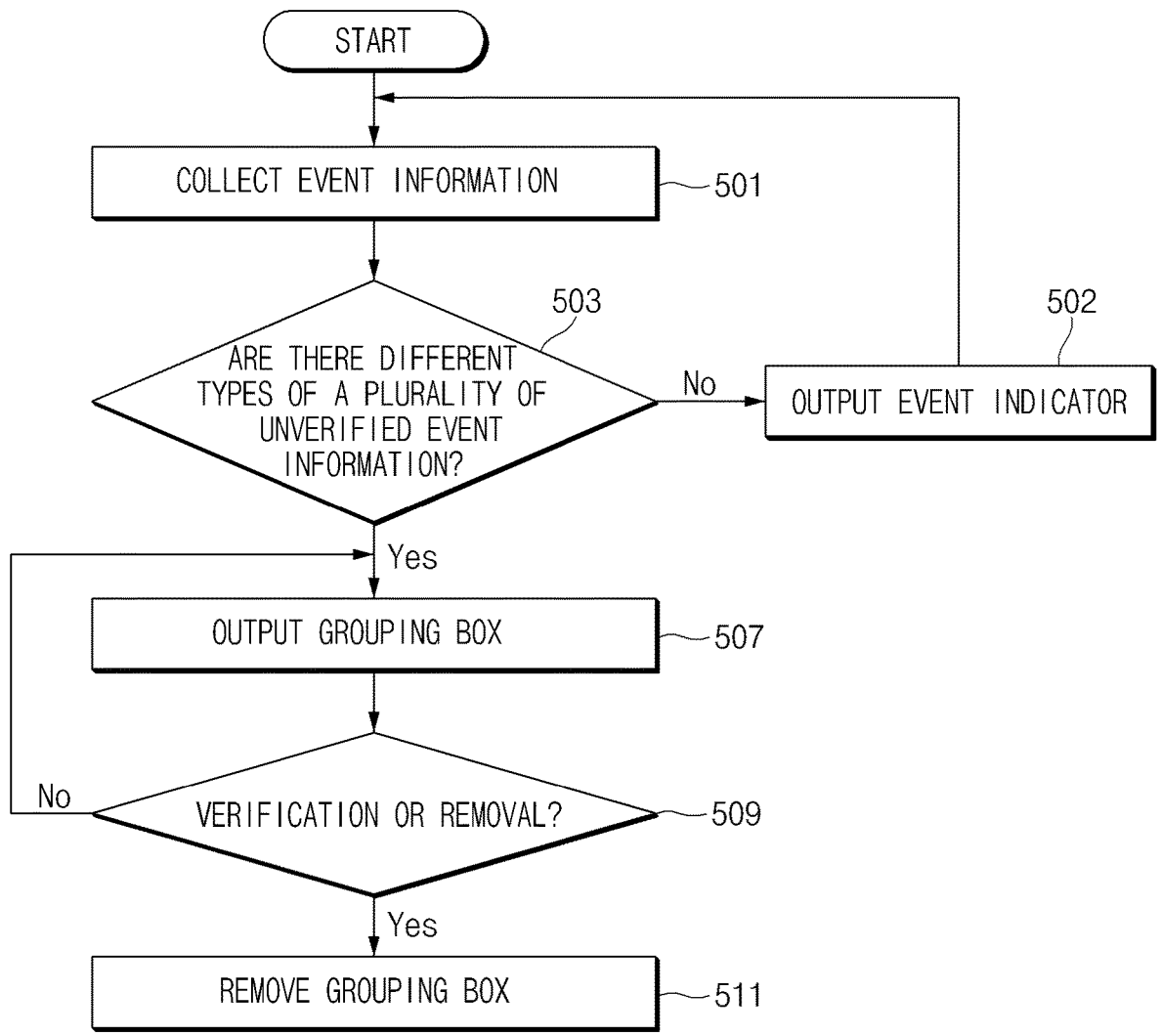
FIG. 5 is a flowchart illustrating a method for processing an event notification using a grouping box according to an embodiment of the present disclosure.

FIG. 5 is a flowchart illustrating a method for processing an event notification using a grouping box according to an embodiment of the present disclosure. For example, the method of FIG. 5 will be described as being performed by the electronic device 100 of FIG. 1 including the processor of FIG. 2.

Referring to FIG. 5, steps 501, 502, and 503 are the same as steps 401, 402, and 403. Accordingly, a repetitive description of these steps is omitted.

If there are different types of collected event information in step 503, the processor 120 (e.g., the event guide module 123) outputs a grouping box in step 507. The grouping box may include a folder form, a screen form, etc., which includes notification display items corresponding to the different types of collected event information. The grouping box may be displayed in the form of an icon, wherein an image corresponding to at least some of notification display items may be included in the grouping box of the icon form. Different types of event information may be collected when a new event occurs while a user verification for displayed event information corresponding to a previous event has not been received.

In step 509, the processor 120 (e.g., the event guide module 123) determines whether a user input corresponding to verification or removal associated with an event indicator is received. If the user input is not received in step 509, the processor 120 maintains the display of the grouping box in step 507. However, If the user input associated with the verification is received in step 509, the processor 120 may execute a function associated with a notification display item including an event indicator and removes the event indicator in step 511. Alternatively, if the user input associated with the removal is received, the processor 120 may remove a plurality of notification display items respectively including event indicators and a grouping box from a screen.

Although the processor 120, in the method of FIG. 5, generates the grouping box when the plurality events occur and may locate the plurality of notification display items including the event indicators on the grouping box, the present disclosure is not limited thereto. For example, the processor 120 of the electronic device 100 may generate a grouping box corresponding to one generated event, may output the generated grouping box on a screen, and may include one notification display item including an event indicator of the grouping box in connection with collected event information.

Figure 6:
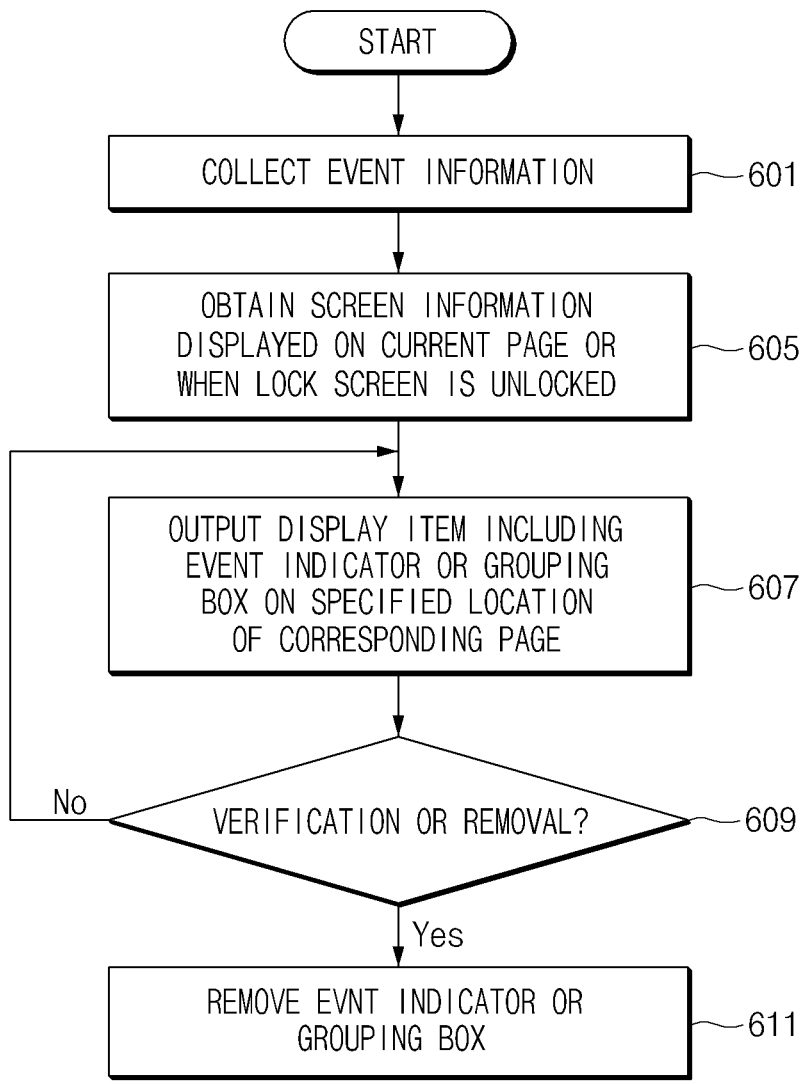
FIG. 6 is a flowchart illustrating a method for processing an event notification based on a specified location according to an embodiment of the present disclosure.

FIG. 6 is a flowchart illustrating a method for processing an event notification based on a specified location according to an embodiment of the present disclosure. For example, the method of FIG. 6 will be described as being performed by the electronic device 100 of FIG. 1 including the processor of FIG. 2.

Referring to FIG. 6, in step 601, the processor 120 (e.g., the event collection module 121) collects event information according to an occurrence of an event.

In step 605, the processor 120 (e.g., the event guide module 123) obtain screen information (or page information) configured to be displayed on a current page or when a lock screen is unlocked. Alternatively, the processor 120 may collect information about a home screen (or a set idle screen such as a home page) and screen information configured to be initially displayed when the display 160 is turned on from a turn-off state, based on settings.

In step 607, the processor 120 (e.g., the event guide module 123) outputs a notification display item including an event indicator (or a grouping box) corresponding to the collected event information on a specified location of the page. For example, the processor 120 may output the notification display item including the event indicator or the grouping box on a screen where the display 160 is performed immediately before it is turned off. Alternatively, the processor 120 may output the notification display item including the event indicator on a specified location such as a screen output as a lock screen is unlocked and a home screen (or a set idle screen such as a homepage). If the display 160 is changed from a turn-off state to a turn-on state, the processor 120 may generate a new screen (e.g., a new homepage) to be output, a new screen to be newly output when a lock screen is unlocked, or a new screen to be newly output when a user input associated with movement of an idle screen occurs (e.g., when a home key is input). The processor 120 may output the notification display item including the event indicator or the grouping box on the newly generated screen.

In step 609, the processor 120 determines whether a user input associated with verification or removal associated with processing the event indicator is received. If the user input is not received in step 609, the processor 120 maintains the output of step 607. For example, the processor 120 may execute a specified function or may switch to a sleep state based on a user input, while maintaining step 607.

If the user input corresponding to the verification or removal associated with the event indicator is received in step 609, the processor 120 (e.g., the event guide module 123) may remove the event indicator or the grouping box in step 611. For example, if verification associated with a notification display item including all event indicators is performed, the processor 120 may remove the grouping box. Although one event indicator remains, the processor 120 may maintain the grouping box. Alternatively, if a user input associated with removing all event indicators occurs, the processor 120 may remove the grouping box.

According to an embodiment of the present disclosure, a method for processing an event notification may include collecting specified event information and displaying a notification display item indicating the specified event information, the notification display item being output on a specified screen location different from a location where a display item which is substantially the same as the notification display item is displayed.

The method may further include outputting an event indicator associated with the number of times the event occurs (or the number of the event information) on a region adjacent to the notification display item.

The method may further include outputting a grouping box including notification display items corresponding to a plurality of unidentified event information of different types of applications.

The method may further include receiving a user input for selecting a grouping box and displaying notification display items included in the grouping box in a specified arrangement.

The method may further include outputting at least one of an all-removal virtual object configured to remove all of a plurality of notification display items or a list view virtual object configured to display list items including at least some of event details of the notification display items.

The method may further include outputting a previous state forward object configured to restore to a list view previous state.

The method may further include removing the grouping box from a screen of an electronic device when the all-removal virtual object is selected.

The method may further include outputting a currently displayed notification display item and a new notification display item corresponding to event information associated with a different type of an application to be adjacent to the notification display item.

The method may further include removing a display item, which is substantially the same as the notification display item, from a screen of the electronic device.

The method may further include generating a new home screen. The outputting of the notification display item may include outputting the notification display item on the new home screen.

The method may further include removing the new home screen after performing processing associated with removing the notification display item.

The method may further include dividing a specified screen. The outputting of the notification display item may include outputting the notification display item on a region of any one of the divided screens.

Figure 7:
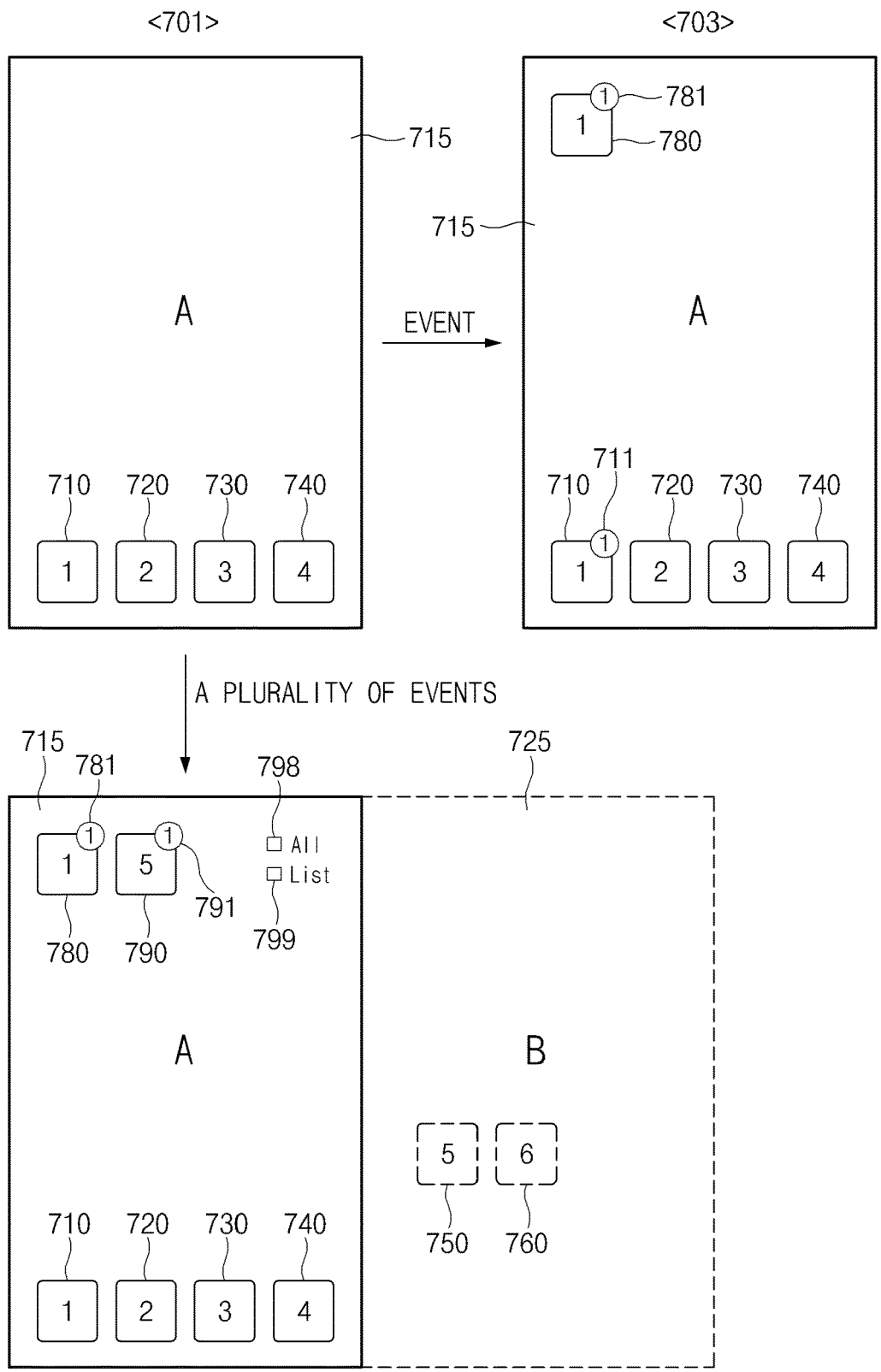
FIG. 7 illustrates example screen interfaces associated with outputting a display item based on an occurrence of an event according to an embodiment of the present disclosure.

FIG. 7 illustrates example screen interfaces associated with outputting a display item based on an occurrence of an event according to an embodiment of the present disclosure.

Referring to FIG. 7, a display of an electronic device may output at least one default display item on a specified screen such as screen 701, which includes four default display items 710, 720, 730, and 740 (e.g., icons) on a first home screen 715. The default display items 710, 720, 730, and 740 may include an icon having a shortcut function, an icon having a soft key function, etc. The first home screen 715 may be a screen initially output when a lock screen is unlocked. Alternatively, the first home screen 715 may include a screen initially output if the display is changed from an off state to an on state.

In response to event information being generated based on an occurrence of a specified event, the display outputs a notification display item 780 including an event indicator 781 on a specified location of screen 703. The notification display item 780 may be the same item as the first default display item 710. The specified location of the notification display item 780 including the event indicator 781 may also be changed, for example, according to settings. Additionally or alternatively, a specific default event indicator 711 may be displayed on or adjacent to a region where the first default display item 710 is displayed based on collection of event information. The event indicator 781 on or adjacent to the notification display item 780 and the default event indicator 711 may be objects which have different arranged locations and indicate substantially the same details.

If a plurality of events are generated or if there are a plurality of unidentified event indicators, the display may locate a plurality of display items respectively including event indicators on screen 705.

On screen 705, the electronic device has the first home screen 715 and a second home screen 725, where the four default display items 710, 720, 730, and 740 are included in the first home screen 715, and two default display items 750 and 760 are included in the second home screen 725. The first home screen 715 may be a home screen designated as a default screen, e.g., a screen displayed when a home key is input.

If the plurality of events are generated or if there are the plurality of unidentified events, as illustrated in FIG. 7, the display may display a first notification display item 780 including a first event indicator 781 and may display a second notification display item 790 including a second event indicator 791 on a region adjacent to the first notification display item 780. The first notification display item 780 may be an item which is substantially the same as the first default display item 710. as Although screen 705 illustrates an event indicator is not displayed on each of the default display items 710, 720, 730, and 740 in response to displaying a display item including an event indicator on a specified location (e.g., a location of the representative home screen 715), the present disclosure is not limited thereto.

After the first notification display item 780 including the first event indicator 781 is displayed on the first home screen 715 in response to occurrence of an event, the second notification display item 790 which corresponds to the fifth default display item 750 located on the second home screen 725 and includes the second event indicator 791 is located on a region of the first home screen 715 in response to occurrence of another event. The sixth default display item 760 may be located on the second home screen 725 based on settings other than the fifth default display item 750.

If an event associated with the fifth default display item 750 is generated before an event associated with the first default display item 710, a display state may be changed. For example, the second notification display item 790 may be located in a location of the first notification display item 780 and the first notification display item 780 may be located in a location of the second notification display item 790, in response to an event order.

The display outputs a removal all virtual object 798 for removing the plurality of notification display items 780 and 790 at once, and a list view virtual object 799 for viewing a list of event details for the plurality of notification display items 780 and 790. If the remove all virtual object 798 is selected, the display may restore to a state of screen 701. Alternatively, if the list view virtual object 799 is selected, the display may output a list screen including a list with at least some of the event details.

Figure 8:
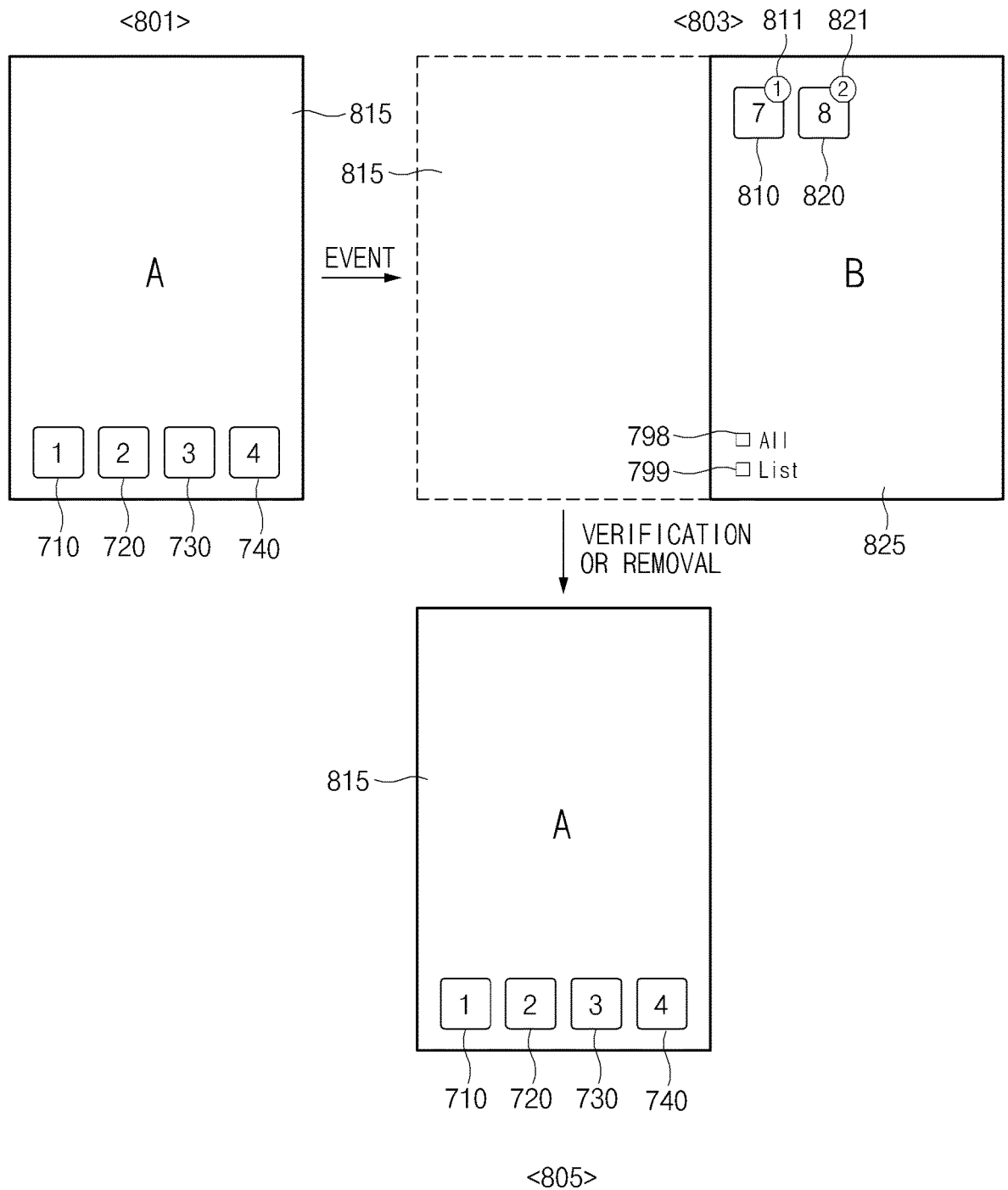
FIG. 8 illustrates example screen interfaces associated with an event notification based on generation of a new screen according to an embodiment of the present disclosure.

FIG. 8 illustrates example screen interfaces associated with an event notification based on generation of a new screen according to an embodiment of the present disclosure.

Referring to FIG. 8, a display of an electronic device outputs screen 801, e.g., as a first home screen 815, which includes default display items 710, 720, 730, and 740. As described above, the first home screen 815 may be a home screen or a specified page.

When the first home screen 815 is set to a default screen (e.g., a screen initially displayed when the display is turned on from an off state, a screen displayed when a lock screen is unlocked, a screen displayed when a home key is input, etc.) and a specified event occurs, the electronic device may collect event information based on the occurrence of the event and generate a new second home screen 825 in response to the collected event information as illustrated on screen 803. The display may locate unidentified display items on a location of the second home screen 825. In addition, a processor of the electronic device may change the second home screen 825 to a default screen. If notification display items 810 and 820 respectively including the event indicators 811 and 821 are removed, the processor may remove the second home screen 825 and revert back to a default screen.

When the display 160 is turned off and is then turned on or if a lock screen is unlocked, where the first home screen 814 is set to the default screen, and there is a display item including an event indicator, the display may output the second home screen 825 as a default screen on screen 803. If there is one of display items respectively including event indicators, the second home screen 825 may be maintained.

As described with reference to FIG. 7, the second home screen 825 includes a remove all virtual object 798 and a list view virtual object 799. If the remove all virtual object 798 is selected, the second home screen 825 may be removed and the display 160 may output the first home screen 815 on screen 805. The notification display items 810 and 820 respectively including the event indicators 811 and 821 may be, for example, items corresponding to icons located on another home screen or items corresponding to icons located on an application collection region (e.g., an all-apps screen).

Figure 9:
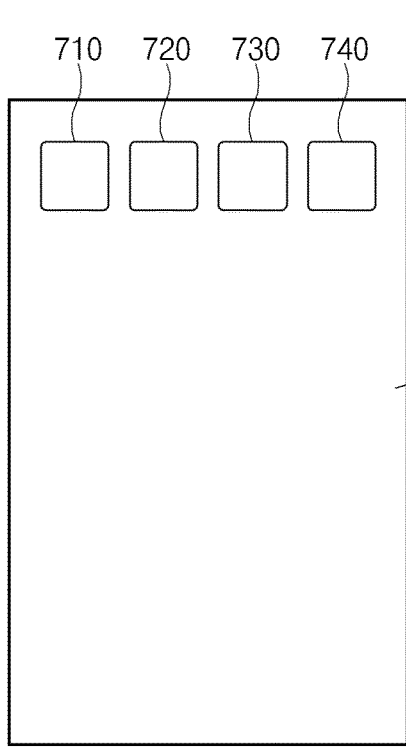
FIG. 9 illustrates example screen interfaces associated with operating a grouping box according to an embodiment of the present disclosure.
Figure 9:
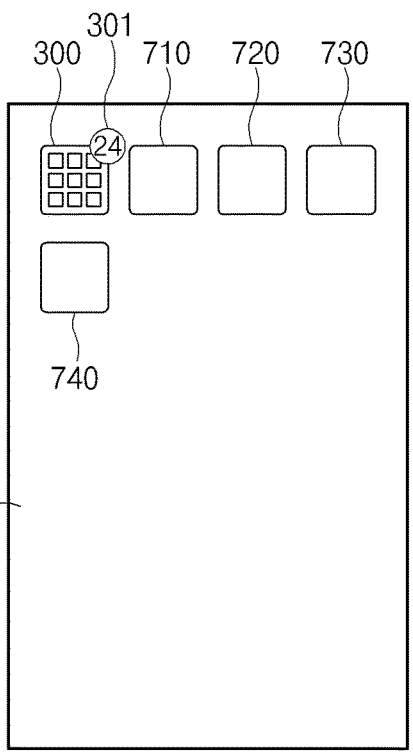
Figure 9:
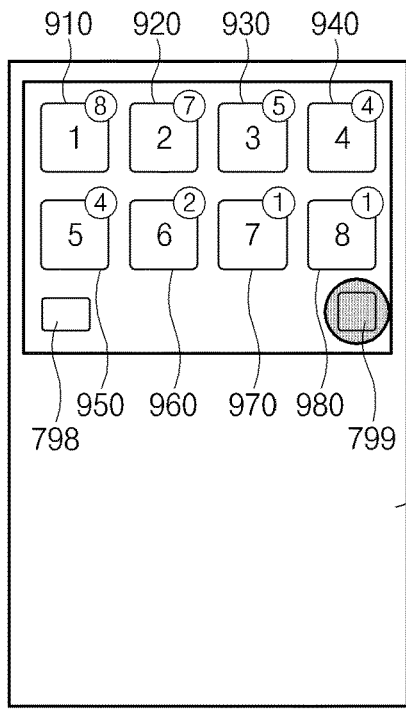
Figure 9:
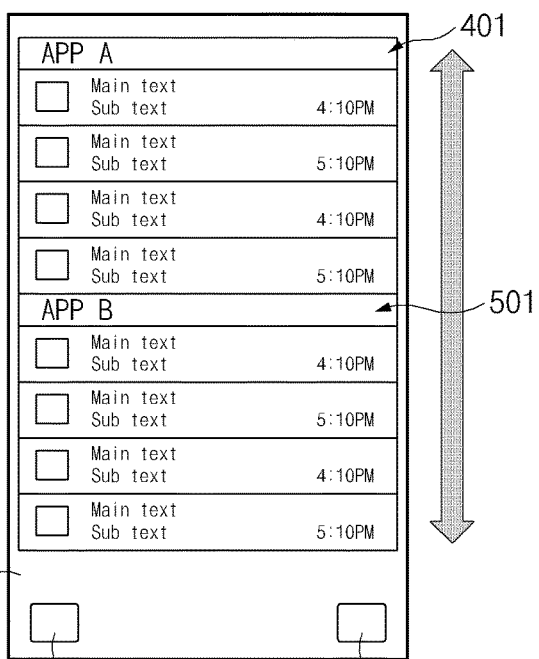

FIG. 9 illustrates example screen interfaces associated with operating a grouping box according to an embodiment of the present disclosure.

Referring to FIG. 9, an electronic device outputs a default screen including default display items 710, 720, 730, and 740, on screen 901, e.g., in response to a user input. The default screen 915 may be an application collection region (e.g., an all-apps screen), a home screen, etc. The four default display items 710, 720, 730, and 740 are located on the default screen 915. If a specified event occurs, the electronic device displays a grouping box 300 including notification display items respectively including event indicators on screen 903. For example, screen 903 positions the grouping box 300 on its left upper end. However, the grouping box 300 may also be set to be displayed on a right upper end or a left lower end. An indicator 301 for indicating the accumulated number of event indicators of the notification display items included in the grouping box 300 is located on or adjacent to the grouping box 300.

As the grouping box 300 is output, a location of each of the default display items 710, 720, 730, and 740 may be moved. For example, the first default display item 710 included in the grouping box 300 may be moved to another location, or all of the default display items 710, 720, 730, and 740 may be shifted to the right by one space.

If a user input for selecting the grouping box 300 is generated, the display may display a screen 935 associated with the grouping box 300 on screen 905, where the grouping box 300 includes eight notification display items 910, 920, 930, 940, 950, 960, 970, and 980. There also may be a plurality of event indicators associated with the notification display items 910, 920, 930, 940, 950, 960, 970, and 980. For example, the number of event indicators associated with a notification display item associated with a chat function may be determined based on the number of transmitted and received unidentified messages.

A screen where the grouping box 300 is executed may also include a remove all virtual object 798 and a list view virtual object 799.

If a specified event is additionally generated, notification display items, all of which were previously removed, currently generated notification display items, or a grouping box including previous notification display items and a current notification display item may be output.

If the list view virtual object 799 is selected, the electronic device may output a list screen 945, on which at least some of details associated with event indicators are displayed, on screen 907. The list screen 945 may include items including details associated with event indicators for each type of an application. In FIG. 9, the display includes a region where list items 401 associated with the fourth notification display item 940 and list items 501 associated with the fifth notification display item 950 are located. The list screen 945 may be changed in response to a user input (e.g., a scroll input). Thus, the display may display regions where list items associated with other notification display items are located. On screen 907, the display includes a remove all virtual object 798 and a previous state forward object 797. When the previous state forward object 797 is selected, the electronic device may restore screen 905. If the remove all virtual object 798 is selected, the electronic device may output screen 901.

Figure 10:
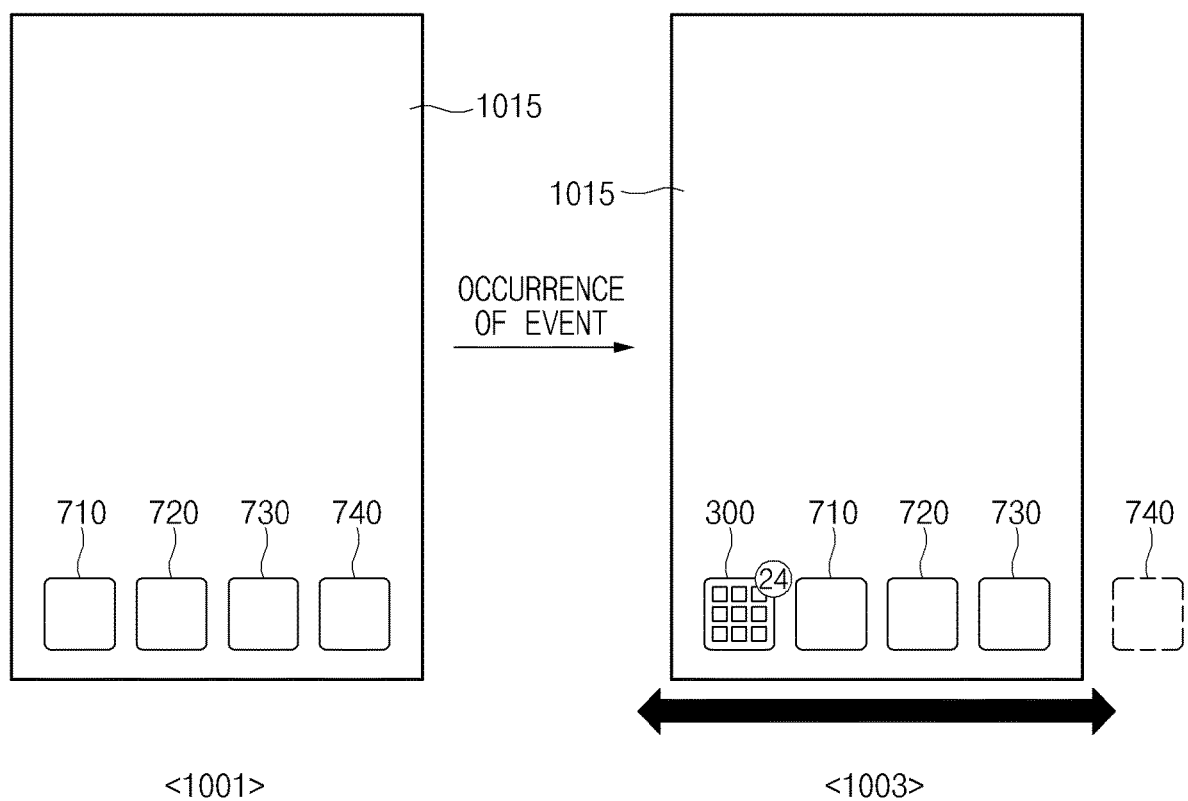
FIG. 10 illustrates example screen interfaces associated with operating a grouping box according to an embodiment of the present disclosure.

FIG. 10 illustrates example screen interfaces associated with operating a grouping box according to an embodiment of the present disclosure.

Referring to FIG. 10, the electronic device displays a default screen 1015 including default display items 710, 720, 730, and 740, on screen 1001, e.g., in response to a user input or based on settings. The default display items 710, 720, 730, and 740 may be shortcut items or soft key items. A grouping box 300 is output on a specified location of the default screen 1015 on screen 1003, in response to occurrence of a specified event. For example, the grouping box 300 may be output a point of a location where the default display items 710, 720, 730, and 740 are located. As the grouping box 300 is output, a default display item which is present in a location of the grouping box 300 may be moved to another location.

As illustrated in FIG. 10, each of locations of the default display items 710, 720, 730, and 740 may be moved in a direction by one space based on arrangement of the grouping box 300. As the locations of the default display items 710, 720, 730, and 740 are moved, the displaying of a default display item, which may fail to be displayed on a current screen may be temporarily omitted. If the grouping box 300 is removed, as default display items, locations of which are moved, restore to original locations, the default display item, the displaying of which is omitted, may be displayed again.

As an event occurs, a notification display item on which an event indicator is displayed may be displayed on a location where the grouping box 300 is currently located. In response to this, the default display items 710, 720, 730, and 740 may be moved. When a verification of the event information associated with a previously generated event is not received and an additional event (e.g., an event associated with a different type of an application) is generated, the grouping box 300 may be output. The grouping box 300 may include notification display items corresponding to event information associated with a plurality of unidentified events. If the same type of an event is repeatedly generated, a numerical event indicator of a notification display item may be increased to reflect the number of times the event occurs. Screen 905 described with reference to FIG. 9 may be output in response to selection of the grouping box 300.

Although four display items 710, 720, 730, and 740 are displayed in the embodiments above, the present disclosure is not limited thereto. For example, three default display items (e.g., the default display items 710, 720, and 730) may be located based on user settings. In this case, if a notification display item including an event indicator or the grouping box 300 is added, the grouping box 300 and the three default display items are located in one row without omitting the displaying of a default display item. If the grouping box 300 is removed, the three default display items may be changed to an original location.

Figure 11:
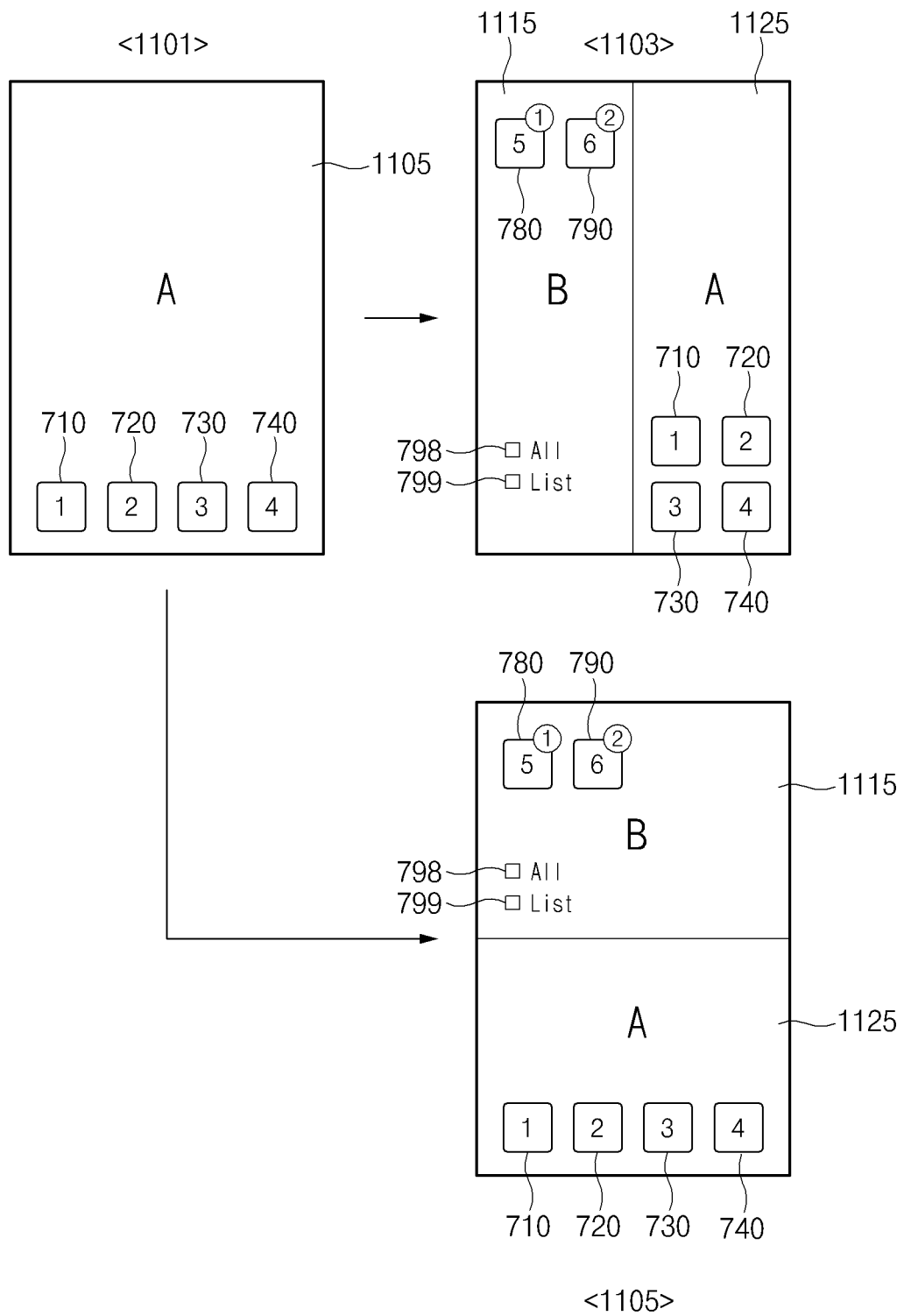
FIG. 11 illustrates example screen interfaces associated with outputting a display item by dividing a screen according to an embodiment of the present disclosure.

FIG. 11 illustrates example screen interfaces associated with outputting a display item based on dividing a screen according to an embodiment of the present disclosure.

Referring to FIG. 11, if a display is turned or if a lock screen is unlocked, an electronic device may output a default screen 1105, such as screen 1101 on the display. The default screen 1105 includes default display items 710, 720, 730, and 740, which may vary in number according to user settings.

When the default screen 1105 is output and a specified event occurs, the electronic device divides the basic screen 1105 into a first screen region 1115 and a second screen region 1125 on screen 1103. The electronic device outputs notification display items 780 and 790 respectively including event indicators according to the occurrence of the event on the first screen region 1115. Although one specified event occurs, as illustrated in FIG. 11, the electronic device may divide a screen and output a notification display item including an event indicator on one of the divided screens.

The electronic device outputs a remove all virtual object 798 for removing notification display items respectively including a plurality of event indicators once and a list view virtual object 799 for viewing at least some of details of an event indicator in the form of a list on the specified region. Although the notification display items 780 and 790 respectively including event indicators, the remove all virtual object 798, and the list view virtual object 799 are located on the first screen region 115 and the default display items 710, 720, 730, and 740 are located on the second screen region 1125, the present disclosure is not limited thereto. For example, the second screen region 1125 may be located at a left side, and the first screen region 1115 may be located at a right side. Alternatively, the first screen region 1115 and the second screen region 1125 may be changed in location in response to a user input.

The electronic device may locate the first screen region 1115 and the second screen region 1125 at upper and lower sides on screen 1105. Thus, the notification display items 780 and 790, the remove all virtual object 798, and the list view virtual object 799 may be located on the first screen region 1115 located at the upper side, and the default display items 710, 720, 730, and 740 may be located on the second screen region 115. As described above, the first screen region 1115 and the second screen region 1125 may be changed in location in response to a user input.

According to an embodiment of the present disclosure, an electronic device may include a memory configured to store event information based on occurrence of an event and a notification display item to be output based on the occurrence of the event, a display configured to output the notification display item in response to the occurrence of the event, and a processor configured to be electrically connected with the memory and the display. The processor may be configured to display a notification display item indicating collection of specified event information on the display if the specified event information is collected, the notification display item being output on a specified screen location different from a location where a display item which is substantially the same as the notification display item is displayed.

The processor may be configured to output an event indicator associated with the number of times the event occurs (or the number of the event information) on a region adjacent to the notification display item.

The processor may be configured to output a grouping box including notification display items corresponding to a plurality of unidentified event information of different types of applications.

The processor may be configured to display the notification display items included in the grouping box in a specified arrangement if receiving a user input for selecting the grouping box.

The processor may be configured to output at least one of an all-removal virtual object configured to remove all of a plurality of notification display items, a list view virtual object configured to display list items including at least some of event details (or event information) of the notification display items, or a previous state forward object configured to restore to a list view previous state.

The processor may be configured to remove the grouping box from a screen of the electronic device when the all-removal virtual object is selected.

The processor may be configured to output a currently displayed notification display item and a new notification display item corresponding to event information associated with a different type of an application to be adjacent to the notification display item.

The processor may be configured to generate a new home screen and output the notification display item on the new home screen.

The processor may be configured to remove the new home screen after performing processing associated with removing the notification display item.

The processor may be configured to divide a specified screen and output the notification display item on a region of any one of the divided screens.

An electronic device may include a memory configured to store event information based on occurrence of an event and a notification display item to be output based on the occurrence of the event, a display configured to output the notification display item in response to the occurrence of the event, and a processor configured to be electrically connected with the memory and the display. If there are a plurality of unidentified event information of different types of applications, the processor may locate notification display items respectively including event indicators corresponding to the event information to be adjacent to each other. Alternatively, the processor may locate the notification display items to be adjacent to each other, the notification display items being displayed on a location of a specified screen.

An electronic device may include a memory configured to store event information based on occurrence of an event and a notification display item to be output based on the occurrence of the event, a display configured to output the notification display item in response to the occurrence of the event, and a processor configured to be electrically connected with the memory and the display. The processor may generate a new home screen if specified event information is collected based on occurrence of a specified event and may output a notification display item including an event indicator corresponding to the specified event information on the new home screen. The processor may remove notification display items in response to verification of the event information and may remove the new home screen if there is no notification display item on the new home screen. The new home screen may include an initial screen output on the display, for example, when a lock screen is unlocked, when a home key is input, or when the display is changed from a turn-off state to a turn-on state.

An electronic device may include a memory configured to store event information based on occurrence of an event and a notification display item to be output based on the occurrence of the event, a display configured to output the notification display item in response to the occurrence of the event, and a processor configured to be electrically connected with the memory and the display. The processor may output a notification display item including an event indicator corresponding to unidentified event information on a default screen displayed when the display is turned on from a turn-off state or a default screen displayed in response to at least one of when a lock screen is unlocked or when a home key is input. The processor may output the notification display item on a specified location of the default screen. In this case, the notification display item may be an item which is substantially the same as an icon located on a home screen or an application icon collection screen.

Herein, the term "module" may represent, for example, a unit including one or more combinations of hardware, software and firmware. The term "module" may be interchangeably used with the terms "unit", "logic", "logical block", "component" and "circuit". A "module" may be a minimum unit of an integrated component or may be a part thereof. A "module" may be a minimum unit for performing one or more functions or a part thereof. A "module" may be implemented mechanically or electronically. For example, a "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an embodiment of the present disclosure may be implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). A program instruction may include a mechanical code such as things generated by a compiler and also a high-level language code executable on a computer using an interpreter. The hardware unit may be configured to operate via one or more software modules for performing an operation according to various embodiments, and vice versa.

A storage media according to an embodiment of the present disclosure may include a memory configured to store at least one instruction and a processor configured to execute the instructions stored in the memory. The instructions executed by the processor may be configured to cause the processor of an electronic device to collect specified event information and display a notification display item indicating the collection of the specified event information, the notification display item being output on a specified screen location different from a location where a display item which is substantially the same as the notification display item is displayed.

A module or a program module according to an embodiment of the present disclosure may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

As described above, in accordance with an embodiment of the present disclosure, a user may easily and quickly recognize an occurrence of an event and more simply process event information obtained based on the occurrence of the event by an electronic device collecting and locating an event indicator associated with an event notification on a specified location.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device, comprising: a display screen; and a processor electrically connected to the display and configured to: identify that a collection of different types of event information is obtained, control the display to display a grouping box icon indicating that the collection of different types of event information is obtained, control the display to display an indicator on or adjacent to the grouping box icon that indicates an accumulated number of event indicators of a plurality of notification display items included in the grouping box icon,
    wherein each event indicator of the plurality of notification display items is associated with a number of times of an event is generated;
    control the display to expand the grouping box icon to display the plurality of notification display items in a multi-thumbnail structure simultaneously with a list view virtual object in response to a user selection of the grouping box icon, wherein each of the plurality of notification display items included in the expanded grouping box icon is displayed with the respective corresponding event indicator, and
    control the display to display a list of event details corresponding to the event indicators of the plurality of notification display items in response to a user selection of the list view virtual object,
    wherein the list of event details include a plurality of items and each item includes a detail corresponding to an event from the event indicators, wherein the plurality of items are grouped to correspond to a respective notification display item, and wherein the plurality of notification display items corresponds to different types of applications.

2. The electronic device of claim 1, wherein the processor is further configured to control the display to display at least one of a remove all virtual object for removing all notification display items and a previous state forward object for restoring the display to a previous state.

3. The electronic device of claim 2, wherein the processor is further configured to remove the grouping box icon from display, in response to the remove all virtual object being selected.

4. The electronic device of claim 1, wherein the processor is further configured to control the display to display a new notification display item corresponding to a new event information associated with a different type of an application adjacent to the first grouping box icon.

5. The electronic device of claim 1, wherein the processor is further configured to: generate a new home screen, and control the display to display the grouping box icon on the new home screen.

6. The electronic device of claim 5, wherein the processor is further configured to remove the new home screen from the display, after performing processing associated with removing the grouping box icon.

7. The electronic device of claim 1, wherein the processor is further configured to: divide the display screen into a plurality of screen regions; and control the display to display the plurality of notification display items on of any one of the screen regions.

8. A method for processing event notifications in an electronic device comprising a display screen and a processor electrically connected to the display screen, the method comprising: obtaining a collection of different types of event information; displaying a grouping box icon indicating that the collection of different types of event information is obtained; displaying an indicator on or adjacent to the grouping box icon that indicates an accumulated number of event indicators of a plurality of notification display items included in the grouping box icon;
    wherein each event indicator of the plurality of notification display items is associated with a number of times of an event is generated;
    expanding the grouping box icon to display the plurality of notification display items in a multi-thumbnail structure simultaneously with a list view virtual object in response to a user selection of the grouping box icon, wherein each of the plurality of notification display items included in the expanded grouping box icon is displayed with the respective corresponding event indicator; and
    displaying a list of event details corresponding to the event indicators of the plurality of notification display items in response to a user selection of the list view virtual object,
    wherein the list of event details include a plurality of items and each item includes a detail corresponding to an event from the event indicators, wherein the plurality of items are grouped to correspond to a respective notification display item, and wherein the plurality of notification display items corresponds to different types of applications.

9. The method of claim 8, further comprising displaying a remove all virtual object for removing all notification display items.

10. The method of claim 9, further comprising displaying a previous state forward object for restoring the display screen to a previous state.

11. The method of claim 9, further comprising: removing the grouping box icon from the display screen of the electronic device, when the remove all virtual object is selected.

12. The method of claim 8, further comprising displaying a new notification display item corresponding to a new event information associated with a different type of an application adjacent to the grouping box icon.

13. The method of claim 8, further comprising generating a new home screen, wherein displaying the grouping box icon comprises: displaying the grouping box icon on the new home screen; and removing the new home screen, after performing processing associated with removing the grouping box icon.

14. The method of claim 8, further comprising dividing the display screen into a plurality of screen regions, and display the plurality of notification display items on any one of the screen regions.

* * * * *